No. 623,276. Patented Apr. 18, 1899.
G. H. CLARK.
PNEUMATIC WHEEL TIRE.
(Application filed Sept. 6, 1898.)

(No Model.)

Witnesses:
H. B. Davis.
J. L. Hutchinson

Inventor:
George H. Clark
by B. J. Hayes,
atty.

UNITED STATES PATENT OFFICE.

GEORGE H. CLARK, OF BOSTON, MASSACHUSETTS.

PNEUMATIC WHEEL-TIRE.

SPECIFICATION forming part of Letters Patent No. 623,276, dated April 18, 1899.

Application filed September 6, 1898. Serial No. 690,251. (No model.)

*To all whom it may concern:*

Be it known that I, GEORGE H. CLARK, of Boston, county of Suffolk, and State of Massachusetts, have invented an Improvement in Pneumatic Wheel-Tires, of which the following description, in connection with the accompanying drawings, is a specification, like letters on the drawings representing like parts.

This invention has for its object to construct a pneumatic wheel-tire which may be inflated by means of an air-forcing device attached to or having as a coöperative part of it a tubular needle, commonly called a "hypodermic" needle, which is adapted to be thrust into the tire, thereby obviating the necessity of employing a valve.

In accordance with this invention the tire is provided with a separate sealed sack or pocket containing a sealing or self-healing compound, and said sealed sack or pocket is applied to the inner tube to cover a limited circumscribed area thereof and is adapted to be perforated by a tubular or hypodermic needle which is attached to a suitable air-forcing device. When the needle is withdrawn, the sealing compound closes the perforation. In order that the location of said sealed sack or pocket may be known, an external indication is formed or provided on the tire.

The sealed sack or pocket is preferably composed of two circumscribed pieces of rubber secured together all around the edges and containing a sealing compound, which, for instance, may be composed, essentially, of linseed-oil associated with gum and other ingredients, the sealing compound being of the nature or character that will not harden or become destroyed by heat when the tire is subjected to the usual process of vulcanization.

The sealed sack or pocket is preferably applied to the inside of the air-tube, being cemented to the wall thereof, and when so applied the tubular needle will pass entirely through it when introduced for the purpose of inflating or deflating the tire.

When the sealed sack or pocket is applied to the interior of the air-tube, its inner wall will be made convex, so as to flatten more or less as the tire is inflated, and thereby cause the sealing compound to fill and close the perforations.

Figure 1:
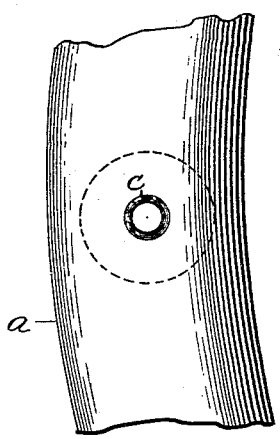
Figure 2:
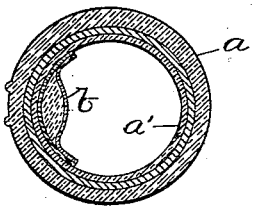
Figure 3:
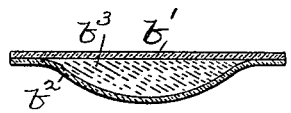

Figure 1 shows an exterior view of a portion of a pneumatic wheel-tire embodying this invention, showing particularly the indication by which the location of the sealed sack or pocket may be determined; Fig. 2, a cross-section of the same; Fig. 3, a cross-sectional view of the sack or pocket removed.

The tire is or may be of any usual or suitable construction, having an air-tube $a'$.

$b$, Fig. 2, represents a sealed sack or pocket of small dimensions which is secured to the interior of the tire—as for instance, it may be composed of two small circular or other-shaped pieces $b'\ b^2$, of rubber, (see Fig. 3,) secured together at their edges only and containing between them a quantity of sealing compound $b^3$, which will not become hardened or destroyed by heat during the ordinary process of vulcanizing the tire. This sealed sack or pocket $b$ is made separate or independent and in its construction suitable means employed to insure its edges all around being securely sealed, and it is then attached to the air-tube $a'$, preferably to the interior thereof, and covers only a limited circumscribed area, and when thus secured in place it may be readily perforated by an ordinary tubular needle—such, for instance, as a hypodermic needle especially adapted for the purpose—which is attached to or forms a part of an air-forcing device.

When the sealed sack or pocket is applied to the interior of the air-tube, its inner wall $b^2$ will be made convex, as shown in Figs. 2 and 3, and said convex inner wall will be more or less flattened when the tire is inflated by the pressure of the air contained in the air-tube. As said convex inner wall is flattened, it will be seen that the perforation which may be made by the needle will close and will be sealed by the sealing compound. It will also be seen that as said convex inner wall is flattened by pressure upon or against it the sealing compound will be more or less compressed and forced to enter and seal the perforations.

When the needle is introduced, it will pass through the outer covering of the tire, and through the wall of the air-tube, and through both walls of the sealed sack or pocket, and through the sealing compound contained in said sack. With the needle thus introduced the tire may be inflated or deflated, and when the needle is withdrawn the sealing compound will act to seal the perforations produced by the introduction of the needle.

On the exterior of the tire a small circle c may be formed to indicate the location of the sealed sack or pocket, or any other sort of an indication may be provided for the accomplishment of this result.

I desire it to be understood that I do not intend to limit my invention to any particular form, construction, or location of the sealed sack or pocket or to any particular form or construction of external indication by which the location of the sealed sack or pocket may be known or determined.

By providing a sealed sack or pocket composed of two pieces or walls secured together at their edges and containing a sealing compound it will be seen that when the tubular needle is inserted both pieces or walls of the sack or pocket will be perforated and by slightly withdrawing the needle the perforation in the inner wall may be closed and sealed before the needle has been withdrawn from the outer wall, and as a consequence the air-tube may be sealed before the needle has been totally withdrawn from the tire—that is to say, the perforation in the inner wall of the sealed sack or pocket may be closed and sealed in advance of the other perforations made by the needle, which is an important feature. Furthermore, by making the sealed sack or pocket separate or independent and thereafter incorporating it in the tire it is possible to so firmly secure its edges all around as to effectually prevent leakage of the sealing compound during the usual processes of vulcanizing the tire.

I claim—

1. A pneumatic wheel-tire having applied to its air-tube to cover a limited circumscribed area thereof, a separate sealed sack or pocket composed of two pieces secured together around their edges and containing a sealing compound, both walls of said sealed sack or pocket being perforated by the tubular needle when inflating or deflating the tire, and the perforations being thereafter closed by the sealing compound, substantially as described.

2. In a pneumatic wheel-tire an external envelop, an air-tube, an independent permanently sealed sack or pocket containing a sealing compound and cemented or otherwise firmly secured in an air-proof manner to the air-tube, covering a limited circumscribed area thereof, and a ring or other mark produced upon the outer envelop immediately over the location of said sack or pocket, substantially as described.

In testimony whereof I have signed my name to this specification in the presence of two subscribing witnesses.

GEORGE H. CLARK.

Witnesses:
   B. J. NOYES,
   JENNIE L. HUTCHINSON.